(12) United States Patent
Fierro et al.

(10) Patent No.: US 6,747,571 B2
(45) Date of Patent: Jun. 8, 2004

(54) UTILITY METER INTERFACE SYSTEM

(75) Inventors: Robert A. Fierro, Island Heights, NJ (US); Martin J. Burns, Derwood, MD (US); Michael A. Guyre, Hackettstown, NJ (US); Gregory P. Kundla, West Orange, NJ (US); Ronald J. Pasquarelli, Verona, NJ (US); Laurie M. Sobczak, Succasunna, NJ (US)

(73) Assignee: Comverge Technologies, Inc., Florham Park, NJ (US)

( * ) Notice: Subject to any disclaimer, the term of this patent is extended or adjusted under 35 U.S.C. 154(b) by 0 days.

(21) Appl. No.: 09/264,095

(22) Filed: Mar. 8, 1999

(65) Prior Publication Data

US 2003/0128134 A1 Jul. 10, 2003

(51) Int. Cl.[7] .............................................. G08C 15/06
(52) U.S. Cl. ............................ 340/870.02; 340/870.03; 340/10.41; 714/749
(58) Field of Search ....................... 340/870.02, 870.03, 340/870.11, 10.41; 725/100; 324/142; 702/62; 714/748, 749

(56) References Cited

U.S. PATENT DOCUMENTS

| 4,393,501 | A | * | 7/1983 | Kellogg et al. ............. 709/237 |
| 4,614,945 | A | * | 9/1986 | Brunius et al. .............. 340/505 |
| 4,940,976 | A | * | 7/1990 | Gastouniotis et al. ........ 136/205 |
| 5,056,107 | A | * | 10/1991 | Johnson et al. ............. 324/110 |
| 5,239,575 | A | * | 8/1993 | White et al. ........... 340/870.02 |
| 5,448,230 | A | * | 9/1995 | Schanker et al. ...... 340/310.06 |
| 5,553,094 | A | * | 9/1996 | Johnson et al. ............. 324/110 |
| 5,594,740 | A |  | 1/1997 | LaDue ....................... 455/410 |
| 5,625,404 | A |  | 4/1997 | Grady et al. ................ 725/114 |
| 5,712,906 | A |  | 1/1998 | Grady et al. ............. 379/43.25 |
| 5,715,390 | A |  | 2/1998 | Hoffman et al. ............. 713/202 |
| 5,717,718 | A |  | 2/1998 | Rowsell et al. .............. 375/260 |
| 5,719,564 | A |  | 2/1998 | Sears .......................... 340/870 |
| RE35,793 | E |  | 5/1998 | Halpern ........................ 702/62 |
| 5,748,104 | A |  | 5/1998 | Argyroudis et al. ... 340/870.11 |
| 5,767,790 | A |  | 6/1998 | Jovellana ............... 340/870.02 |
| 5,953,371 | A | * | 9/1999 | Rowsell et al. ........ 340/870.03 |
| 5,959,549 | A | * | 9/1999 | Synesiou et al. ...... 340/870.02 |
| 5,963,650 | A | * | 10/1999 | Simionescu et al. ... 340/870.02 |
| 6,069,571 | A | * | 5/2000 | Tell ........................ 340/870.02 |
| 6,073,169 | A | * | 6/2000 | Shuey et al. ................. 709/217 |
| 6,078,785 | A | * | 6/2000 | Bush ...................... 340/870.02 |
| 6,124,806 | A | * | 9/2000 | Cunningham et al. . 340/870.02 |
| 6,150,955 | A | * | 11/2000 | Tracy et al. ........... 340/870.02 |

* cited by examiner

Primary Examiner—Albert K. Wong
(74) Attorney, Agent, or Firm—Renner, Otto, Boisselle & Sklar, LLP (57) ABSTRACT

A method and apparatus for facilitating data exchange between a utility meter and a host device includes a first wireless interface device coupled to the meter via a first hardwired connection and a second wireless interface device coupled to the host device via a second hardwired connection. The first wireless interface device and the second wireless interface device are operative to wirelessly exchange data therebetween. According to one embodiment, gateway software is provided within the first wireless interface device to allow the first wireless interface device to initiate on behalf of the host computer a request for the meter to provide predetermined information, acknowledge on behalf of the host computer receipt of data containing the predetermined information, purge data containing the predetermined information of information unrelated to the predetermined information and encrypting and decrypting packets exchanged between the meter and host computer.

23 Claims, 8 Drawing Sheets

UTILITY METER INTERFACE SYSTEM

TECHNICAL FIELD

The present invention relates to a method and apparatus for wirelessly communicating information between a utility meter and a host device. In particular, the present invention relates to a system for facilitating data exchange between the meter and the host device.

BACKGROUND OF THE INVENTION

Utility meters such as gas meters, water meters, and electric meters are commonly used to monitor utility consumption at homes, businesses, and the like. In order to gather consumption information, utility companies routinely send workers to take periodic readings from such meters. Based on the meter reading, the utility company calculates the amount of resources consumed by each customer for the given period and bills the customer for the appropriate amount.

The cost to obtain meter readings from each establishment on an ongoing basis is both expensive and time consuming. For example, not only must a utility company employ a sufficient number of workers to read meters from each geographic region within their service area, but also there is a significant amount of resources involved with transferring and storing the information read into a central computer. Additionally, there is a chance a worker may incorrectly read one or more meters thereby providing incorrect data to the utility company. With deregulation in the electric industry, there has also been a recent trend towards time variant pricing. This, in turn, necessitates more frequent readings to be taken at industrial or commercial establishments (for example hourly readings) and further adds to the transactional costs of obtaining such information.

In order to avoid having to send a worker to read each meter, it is known to establish a wireless communication link between each meter and a host computer located at, for example, a utility company. In this way, the host computer may communicate with the meter at desired times to obtain information related to consumed utilities.

One type of wireless network across which a host computer and meter may exchange information is a cellular digital packet data (CDPD) network. The CDPD network enables wireless transmission of data over existing cellular systems, such as the Advanced Mobile Phone System (AMPS). CDPD networks are designed to provide data communications in the cellular frequency range without impeding voice communications. This is accomplished by transmitting data over cellular channels which are free of voice communications. If a channel which is initially free of voice communication later becomes selected to service a telephone call, the CDPD network switches data communication to another free channel. It will also be appreciated that some CDPD service carriers provide dedicated channels to handle CDPD data communication.

In order to interface the meters to the wireless network, a modem is used. For example, when communicating over a CDPD network, a CDPD modem is used to assemble and de-assemble packets passing between the wired and wireless networks. Thus, CDPD modems interfaces with the meter to allow data to be exchanged across the wireless network. The CDPD modems provide no further processing to the data passing therethrough. The host computer typically is provided access to the CDPD network via an internet connection to a commercial cell site. The commercial cell site allows for communicating data between the internet and the CDPD network thereby providing a path through which data can be communicated between the host computer and the meters.

While the use of wireless technology has improved the ability to gather and store information in a cost effective and timely manner from utility meters, several drawbacks still exist. For example, CDPD technology is based on the premise that some voice communication channels will be available to send the desired data communication. However, the availability of voice channels is not controllable and it often may take a significant amount of time to find a free channel upon which to communicate the desired data. Consequently, there are often undesired delays associated with communicating information over a wireless network.

The delays associated with communicating over the wireless network further affect data exchange between the host computer and meter since each meter typically is configured to retransmit a data packet if an acknowledgment packet is not received from the host computer within a predetermined period of time (e.g. a time-out period). Unfortunately, due to communication delays which could occur in obtaining a wireless communication channel using CDPD technology, such time-out periods often expire. This, in turn, causes the meter to re-transmit data which leads to added wireless traffic and overall system delays.

Additionally, the cost of communicating over CDPD network typically is measured in terms of the number of data bits transmitted. Unfortunately, under current industry standards set forth by the American Meter Reading Association (AMRA), each meters must respond to electronic queries for information in a standardized format which includes a large amount of information which may not be necessary for responding to the request made. When communicating over a wireless network the additional data bits significantly add to the cost of transacting and also increases the amount of information which must be communicated over the limited wireless communication channels.

Still further, the electronic communication of data from meter creates a concern for security with respect to unauthorized individuals viewing or tampering with such data. Such security concerns apply equally for communication of data over both the wireless network and hardwired network since the data could be intercepted, tampered, or viewed during transmission across any such medium.

Accordingly, there exists a need in the art for a method and apparatus of facilitating the electronic exchange of communication between a meter and a host computer which overcomes the drawbacks described above and others.

SUMMARY OF THE INVENTION

The present invention relates to a method and apparatus for facilitating electronic data communication between a utility meter and a host computer. The utility meter may, for example, be an electric meter, gas meter, water meter or the like. The host computer may, for example, be a host computer located at a utility company. Communication between the meters and the host computer occurs over a wireless network using, for example, cellular digital packet data (CDPD).

According to the present invention, gateway software is imbedded within a device coupled to the meter to facilitate data communication between the meter and the host computer. For instance, the gateway software may be programmed into a processor and memory associated with the CDPD modem thereby more effectively utilizing existing hardware components to run the gateway software. This in turn provides a significant cost savings since additional hardware components are not necessary to implement the features discussed herein. Alternatively, the gateway software may be included in a dedicated processor coupled along a connection between the meter and the CDPD modem or within a processor associated with the meter itself.

The gateway software is configured to reduce the amount of data bits wirelessly transmitted over the network as well as provide an added layer of security with respect to data communicated over the hardwired network. In particular, according to one feature of the present invention, the gateway software is configured to initiate communication with the meter to obtain utility data and then forward such data to the host computer. Therefore the host computer does not need to transmit a request for such information over the wireless network as in conventional device. Thus, less data bits are wirelessly transmitted thereby saving cost and more effectively utilizing available bandwidth.

Additionally, according to the present invention the gateway software monitors for data transmissions from the meter and acknowledges receipt of such transmissions on behalf of the host computer. In this way, delays typically involved in receiving an acknowledgment from the host computer due to an inability of the host computer to obtain a free wireless channel is not of significant consequence. Accordingly, the present invention is able to better avoid time outs from occurring at the meter since transmission made by the meter can be acknowledged in a timely manner.

In order to further reduce the amount of data which is transmitted over the wireless network, the gateway software also is configured to purge data packets of unnecessary data bits prior to wireless transfer. In this manner, additional cost savings are obtained since fewer data bits are transmitted over the wireless network.

Further, as a security measure, the gateway software and host computer are each configured to encrypt and de-crypt data communication occurring over the hardwired and wireless networks In this manner, there is a lower possibility of data being viewed or tampered by unauthorized individuals.

Thus, according to one aspect of the present invention, a method of facilitating data exchange between a utility meter for monitoring utility consumption and a host device is provided. The meter is coupled to a first wireless interface device through a first hardwired connection and the host device is coupled to a second wireless interface device through a second hardwired connection. The first wireless interface device and the second wireless interface device are operative to wirelessly exchange data therebetween. The method includes the steps of initiating a request for the meter to provide predetermined information, the request originating from a device coupled to the first hardwired connection, and transmitting from the meter data containing the predetermined information in response to the request.

In accordance with another aspect of the present invention, a method of facilitating data exchange between a utility meter for monitoring utility consumption and a host device is provided. The meter is coupled to a first wireless interface device through a first hardwired connection and the host device is coupled to a second wireless interface device through a second hardwired connection. The first wireless interface device and the second wireless interface device are operative to wirelessly exchange data therebetween. The method includes the steps of receiving at a device coupled to the first hardwired connection data transmitted from the meter and destined for the host computer, and transmitting an acknowledgment packet to the meter by the device, the acknowledgment packet indicating to the meter that the data was received by the host computer.

In accordance with yet another aspect of the present invention, a method of facilitating data exchange between a utility meter for monitoring utility consumption and a host device is provided. The meter is coupled to a first wireless interface device through a first hardwired connection and the host device is coupled to a second wireless interface device through a second hardwired connection. The first wireless interface device and the second wireless interface device are operative to wirelessly exchange data therebetween. The method includes the steps of receiving at a device coupled to the first hardwired connection data transmitted from the meter and destined for the host computer, and processing the data received by the device to remove at least a portion of information stored in the data.

In accordance with still another aspect of the present invention, a method of facilitating data exchange between a utility meter for monitoring utility consumption and a host device is provided. The meter is coupled to a first wireless interface device through a first hardwired connection and the host device is coupled to a second wireless interface device through a second hardwired connection. The first wireless interface device and the second wireless interface device are operative to wirelessly exchange data therebetween. The method includes the steps of receiving at a device coupled to the first hardwired connection data transmitted from the meter and destined for the host computer, encrypting at least a portion of the data by the device, transmitting to the host device the at least a portion of the encrypted data via the first wireless interface device and the second wireless interface device, receiving at the host computer the at least a portion of the encrypted data, and decrypting the at least a portion of the encrypted data by the host computer.

In accordance with yet still another aspect of the present invention, a wireless system for facilitating data exchange between a utility meter and a host device is provided. The system includes a first wireless interface device coupled to the meter via a first hardwired connection, a second wireless interface device coupled to the host device via a second hardwired connection, the first wireless interface device and the second wireless interface device operative to wirelessly exchange data between the meter and the host device, and means for initiating a request for information from the meter, the means coupled to the first hardwired connection.

In accordance with still another aspect of the present invention, a wireless system for facilitating data exchange between a utility meter and a host device is provided. The system includes a first wireless interface device coupled to the meter via a first hardwired connection, a second wireless interface device coupled to the host device via a second hardwired connection, the first wireless interface device and the second wireless interface device operative to wirelessly exchange data between the meter and the host device, and means for removing at least a portion of information stored in the data by the meter prior to receipt by the host device, the means coupled to the first hardwired connection.

In accordance with still another aspect of the present invention, a device for facilitating wireless data exchange between a utility meter for monitoring utility consumption and a host device is provided. The device includes a means for acknowledging receipt on behalf of the host computer of data transmitted by the meter and destined for the host computer.

In accordance with still another aspect of the present invention, a device for facilitating wireless data exchange between a utility meter for monitoring utility consumption and a host device is provided. The device includes means for removing at least a portion of information stored in data transmitted by the meter and destined for the host device prior to receipt of the data by the host device.

In accordance with still another aspect of the present invention, a device for facilitating wireless data exchange between a utility meter for monitoring utility consumption and a host device is provided. The device includes a means for initiating on behalf of the host computer a request for the meter to provide predetermined information.

To the accomplishment of the foregoing and related ends, the invention then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed and the present invention is intended to include all such embodiments and their equivalents. Other objects, advantages and novel features of the invention will become apparent from the following detailed description of the invention when considered in conjunction with the drawings.

DETAILED DESCRIPTION OF THE INVENTION

The present invention will now be described with respect to the accompanying drawings in which like numbered elements represent like parts.

Figure 1:
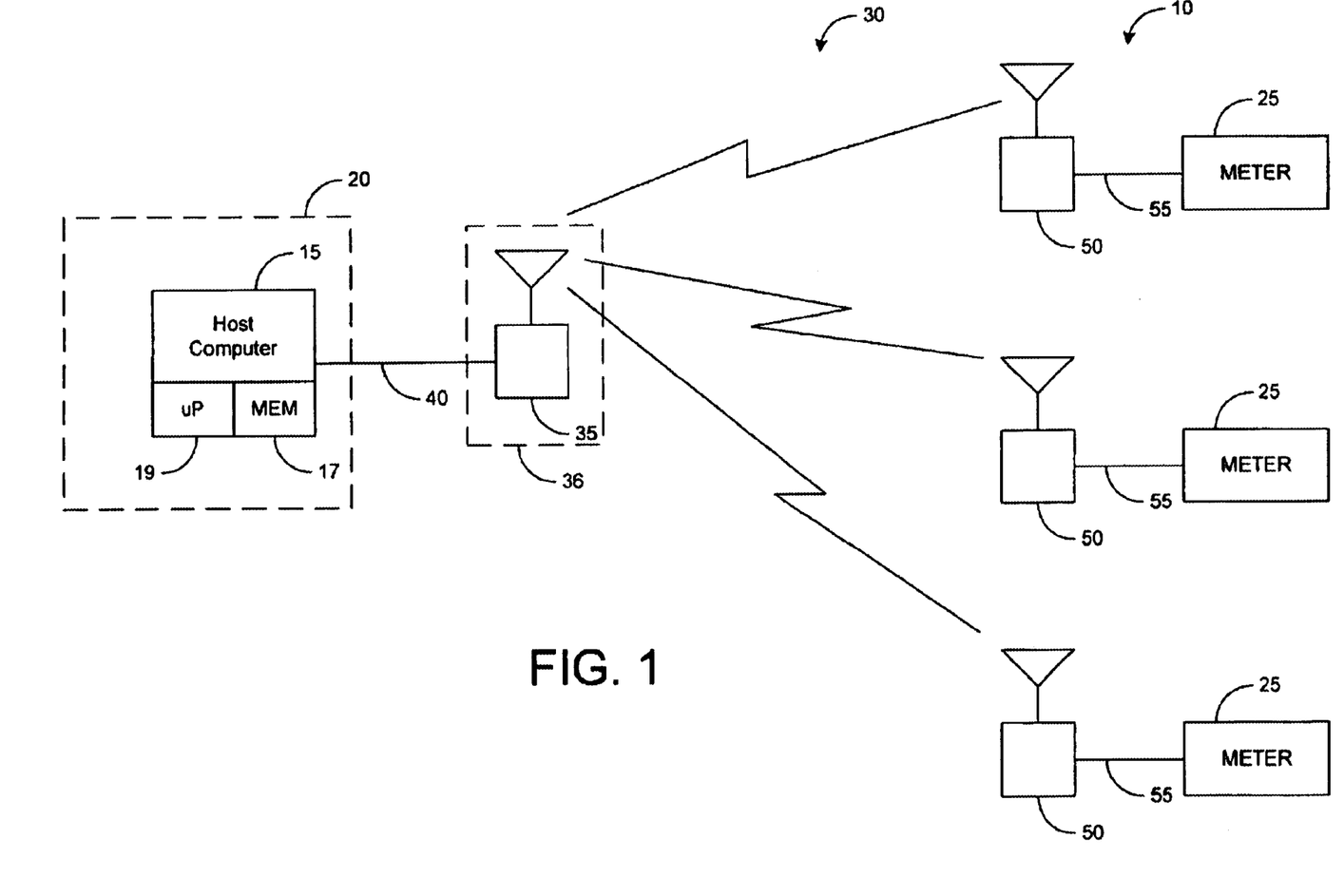
FIG. 1 illustrates a system view of a meter communicating with a host computer through a gateway system in accordance with the present invention.

Referring initially to FIG. 1, a utility meter interface system 10 is depicted in which a host computer 15 situated at a utility company 20 wirelessly communicates with a plurality of utility meters 25. As will be discussed in more detail below, the host computer 15 and utility meters 25 are configured to communicate information related to the amount of utility consumed at each establishment associated with the respective meters 25, for example. In this manner, real time information related to utility consumption can be obtained wirelessly and without the need to send a worker to each establishment to physically read the corresponding meters.

In the present invention, the utility company 20 to which the host computer 15 is associated may be any type of utility company including an electric company, gas company, water company or the like. Similarly, the meters 25 correspondingly may be meters configured to monitor the consumption of electric, gas, water or other resources. For sake of discussion, however, the present embodiment is discussed with respect to the host computer 15 being associated with an electric company and the meters 25 being electric meters.

According to the present invention, communication between the host computer 15 and meters 25 takes place across a wireless network 30. In the present embodiment, the wireless network 30 is a cellular digital packet data (CDPD) network. However, it will be appreciated that the present invention is suitable for use with any connectionless packet type network including a Personal Communication System (PCS), Code Division Multiple Access (CDMA), Time Division Multiple Access (TDMA), frequency hopping (FH), direct sequence spread spectrum (DSSS), and the like. The operations and configurations for gaining access, formatting and exchanging data across these and other wireless networks is in accordance with conventional industry standards and therefore will not be discussed in more detail for sake of brevity. Further it will be appreciated that features of the present invention could be used in conjunction with meters and host computers coupled over a hardwired network.

As shown in FIG. 1, in order to communicate over the wireless network 30, the host computer 15 is coupled to a wireless interface device 35 located in a cell site 36 via an internet or other hardwired connection 40. The meters 25 are coupled to wireless interface devices 50 via hardwired connection 55. In the present embodiment, the wireless interface devices 50 are CDPD modems. The wireless interface devices 35, 50 allow for data packets to be assembled and de-assembled into a format suitable for transmission over the wireless network 30 or hardwired connections 40, 55 as appropriate. Further, as will be discussed in more detail below, the wireless interface devices 50 coupled to the meters 25 include gateway software to facilitate communications between the meters 25 and the host computer 15. In the present embodiment, the hardwired connection 40 connecting the host computer 15 to the cell site 36 and wireless interface device 35 is an internet connection while the hardwired connections 55 connecting the meters 25 to the wireless interface device 50 are an RS-232 connection. Of course, other hardwired connections 40, 55 could alternatively be used.

Figure 2:
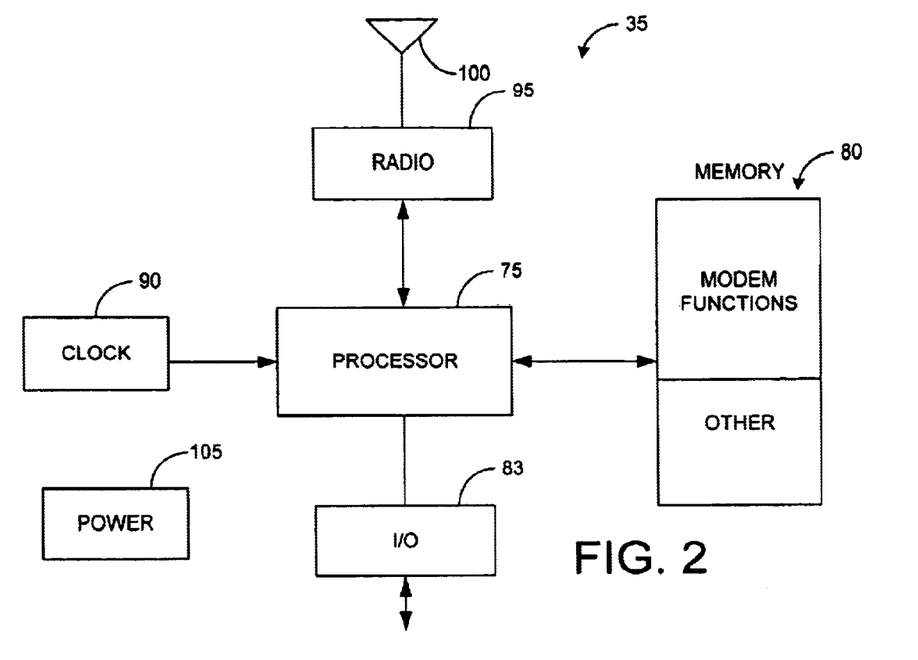
FIG. 2 illustrates a diagrammatic view of a wireless interface device for interfacing the host computer with a wireless network in accordance with the present invention.

Referring now to FIG. 2, a block diagram of the wireless interface device 35 within the cell site 36 is depicted. The wireless interface device 35 includes a central processor 75 for carrying out the operations of assembling and de-assembling packets for transmission over the wireless network 30 and other conventional functions. The processor 75 is coupled to a memory 80 which stores code and other information for operating the wireless interface device 35. For example, the memory 80 includes sections for storing code related to performing the wireless interface device assembling and de-assembling functions, code related to the input/output functions with an external device and other general memory storage space. An Input/output interface device 83 couples the processor 75 to the hardwired connection 40 which in the present embodiment is the internet. A system clock 90 is coupled to the processor 75 and provides a continuous pulse for timing system operations. It will be appreciated that while the clock 90 is depicted as an independent component of the processor 75, the clock 90 could be included within the processor 75. A radio transceiver 95 is also coupled to the processor 75 and allows for wirelessly transmitting and receiving data packets via antenna 100. A power supply 105 is included within the wireless interface device 35 and serves to distribute an appropriate amount of power to each of the components of the wireless interface device 35. The power supply 105 receives power from an external power source as is conventional.

Figure 3:
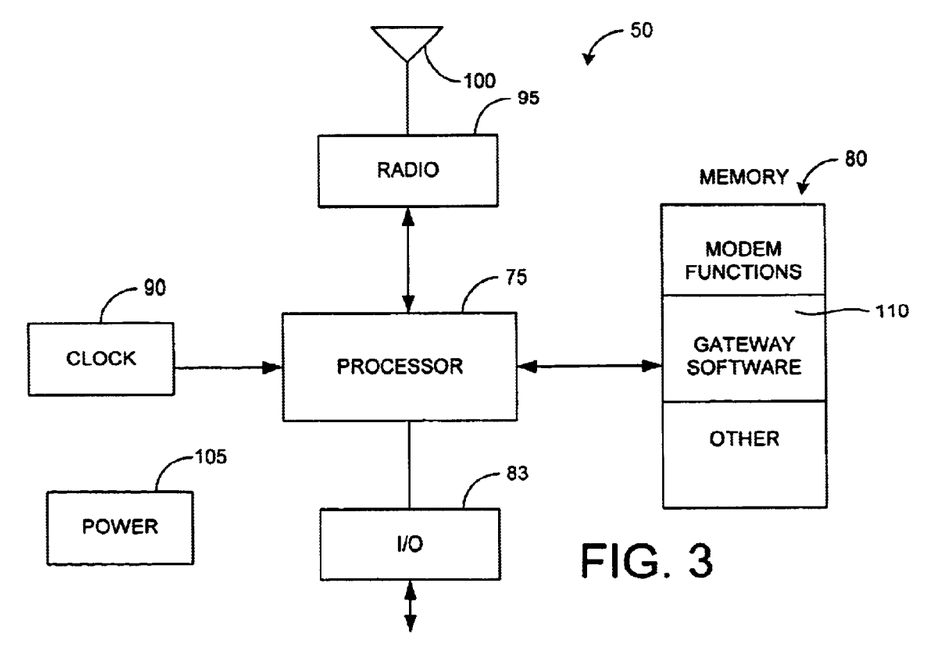
FIG. 3 illustrates a illustrates a diagrammatic view of a wireless interface device having gateway software for interfacing the meter with the wireless network in accordance with the present invention.

Referring now to FIG. 3, a block diagram of the wireless interface device 50 is depicted. The wireless interface device 50 includes each of the components described above with respect to the wireless interface device 35 shown in FIG. 2. Accordingly, items labeled with the same reference number will not again be discussed for sake of brevity. Additionally, however, the wireless interface device 50 includes gateway software 110 stored in memory 80 for facilitating data communication between the meter 25 and host computer 15 as described in detail below. The processor 75 interfaces with the memory 80 to perform the functions called for by the gateway software 110. In the present embodiment, the gateway software 110 advantageously is stored in the memory 80 of the wireless interface device 50 and is executed by the processor 75. Accordingly, the gateway software 110 may be imbedded in the system 10 without the need to add additional hardware circuitry. However, it will be appreciated, that the functions of the gateway software 110 could be obtained by coupling a dedicated processor and memory to the hardwired connection 55 or by imbedding the gateway software 110 within an existing processor and memory associated with each meter 25.

Figure 4:
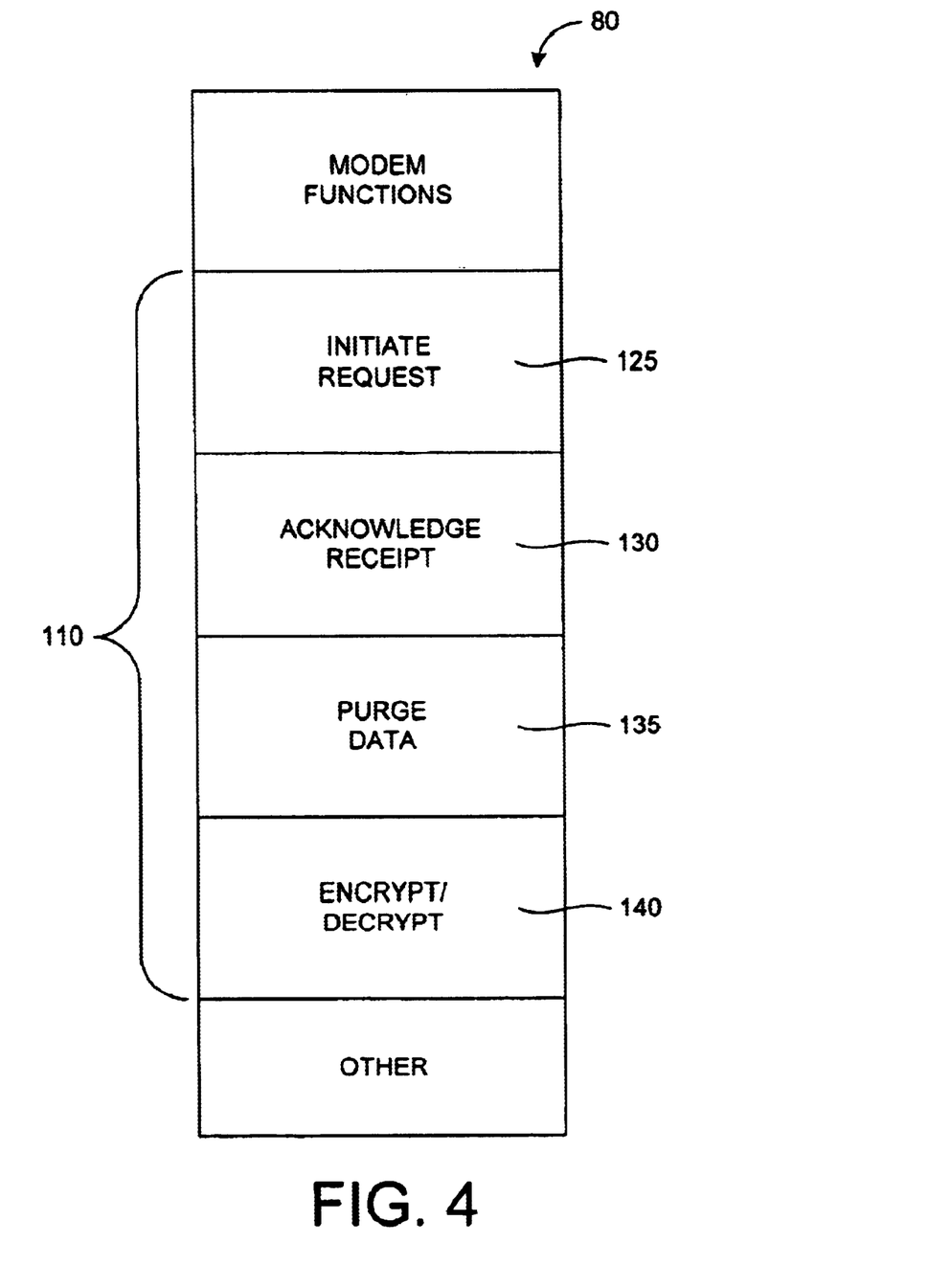
FIG. 4 illustrates gateway software functions stored in memory of the wireless interface device interfacing with the meter in accordance with the present invention.

Referring now to FIG. 4, the functions of the gateway software stored in memory 80 are shown in more detail. In particular, the gateway software 110 stored in the memory 80 is shown to include a first memory block 125 for initiating a request for information from the meter 25, a second memory block 130 for acknowledging receipt of information from the meter 25, a third memory block 135 for purging data of unnecessary data bits prior to transfer over the wireless network, and a fourth memory block 140 for encrypting and decrypting data bits transmitted to or received from the hardwired connection 55. Although each of these functions of the gateway software are shown to be stored in independent memory blocks, it will be appreciated that such functions may be included as part of one software code or package.

As mentioned above, the gateway software provides a variety of functions which aid in facilitating data communication between the host computer 15 and meters 25 to provide a more efficient and secure system 10. For example, the gateway software 110 is able to initiate requests for information from the meters 50 in place of the host computer 15. Accordingly, fewer data bits need to be transmitted over the wireless network to obtain such information thereby reducing the wireless traffic and costs associated therewith. Further, since the gateway software 110 is connected to the meters 25 via a direct hardwired connection 55, the gateway software 110 can acknowledge receipt of all information sent by the meters 25 in a timely fashion thereby reducing the number of time outs which occur. Still further, the gateway software 110 is able to purge or remove unnecessary bits from data packets destined for the host computer 15 thereby significantly reducing the number of data bits which need to be wirelessly transmitted. As an added security measure, the gateway software 110 also encrypts data packets to allow for protected data transmission over the hardwired connection 40 coupled to the host computer 15. Such encryption may, for example, be in addition to any encryption/decryption already performed by the wireless interface devices 35, 50 during the transfer of data over the wireless network 30.

Figure 5:
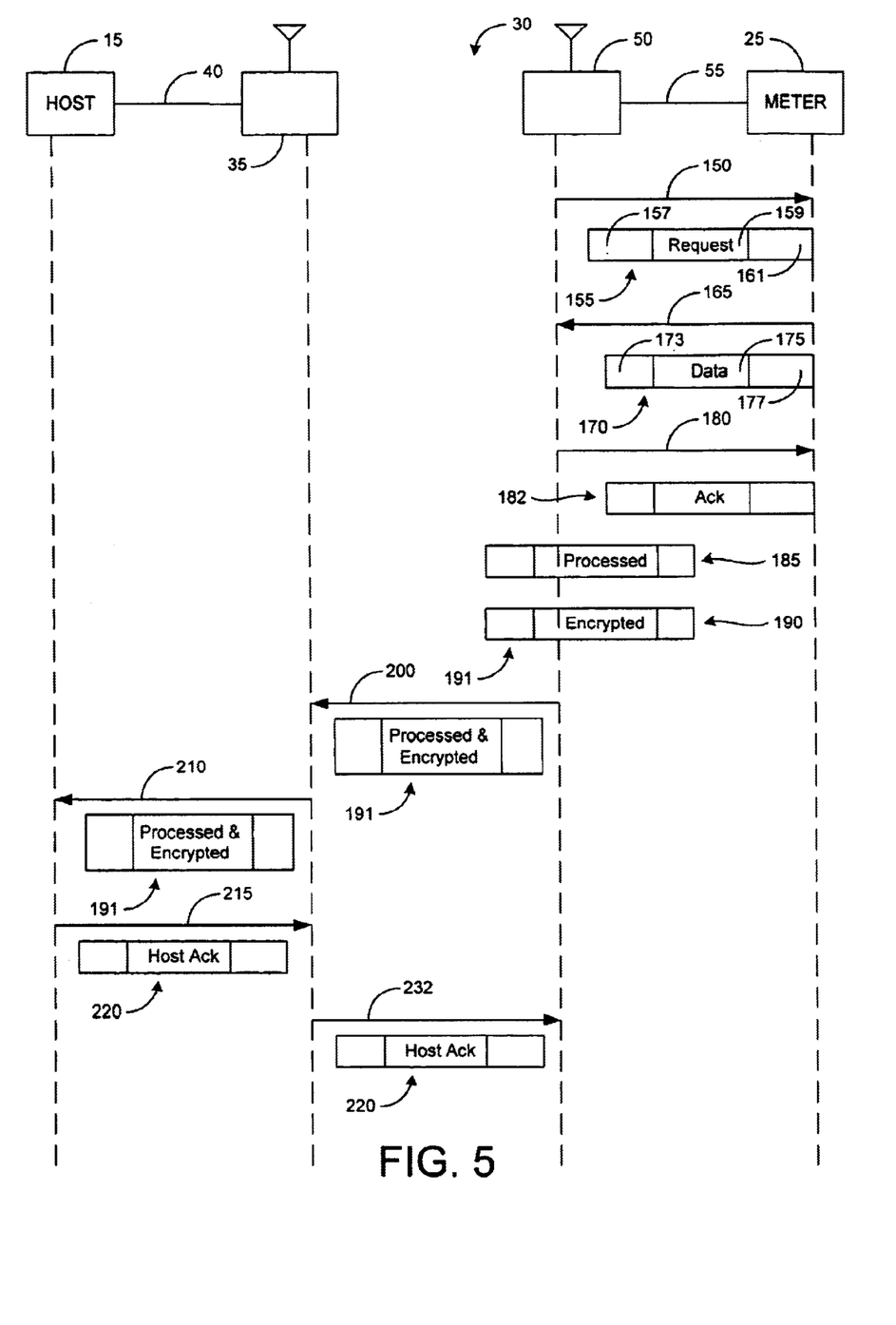
FIG. 5 illustrates the packet exchange between the host computer and meter according to an exemplary embodiment of the present invention.

Turning now to FIG. 5, an exemplary data exchange between the host computer 15 and meter 25 is depicted in accordance with the present embodiment. In particular, referring to step 150, the gateway software 110 within the wireless interface device 50 is shown to initiate a request for information from the meter 25 by transmitting a Request For Information packet 155. The gateway software 110 may for example be programmed to send a Request For Information packet 155 at certain predetermined time intervals which correspond to a billing cycle for the utility company 20. The Request For Information packet 155 includes a header section 157, a data section 159 and an error correcting section 161. The data section 159 includes indicia indicating the types of information being requested. For example, in the present embodiment, the information being requested is the amount of power consumed for a given time period as measured by the meter 25. The precise format for the Request For Information packet 155 is the same as the conventional format used by the host computer 15 to retrieve information which is in accordance with the standards set forth by the American Meter Reading Association (AMRA). In this manner, transactions originated by the gateway software 110 appear the same as those originated by the host computer 15 and thus the gateway software 110 is transparent to the meter 25.

In step 165, the meter 25 responds to the Request For Information packet 155 with a Data Packet 170. The format of the Data Packet 170 is also in accordance with the standards set forth by the AMRA and includes a header section 173, a data section 175 and an error correction section 177. Because the AMRA provides for a predefined set of information to be sent by the meters 25 in response to any inquiry for information, the data section 175 of the Data Packet 170 includes a significantly greater amount of information than is specifically requested. For instance, in addition to information regarding the amount of power consumed during the specific requested period, the data section 175 also contains information related to other time periods for which data will have already been collected by the host computer 15 from prior specific time period requests.

Following receipt of the Data Packet 170, the wireless interface device 50 in step 180 substantially immediately transmits an Acknowledge packet 182 in accordance with the acknowledge receipt program 130 stored in the gateway software 110. The format of the Acknowledge packet 182 follows conventional packets formats set forth by the AMRA. Because the Acknowledge packet 182 originates from the wireless interface device 50 coupled to the meter 25 through the hardwired connection 55, the meter 25 is able to receive the Acknowledge packet 182 without significant delay thereby minimizing time-outs from occurring in the meter 25. In comparison, acknowledgment packets sent by the host computer 15 in conventional systems often take a substantially longer period of time to reach the meter 25 due to delays associated with gaining access to the wireless network 30.

In addition to acknowledging receipt of the Data Packet 170, the processor 75 also continues to process the Data Packet 170 for transmission to the host computer 15. Thus, as shown in step 185, in order to reduce the number of data bits which are transmitted over the wireless network 30, the processor 75 purges the Data Packet 170 of unnecessary data bits prior to wireless transmission in accordance with the purge data function 135 of the gateway software 110. In particular, the processor 75 removes from the data section 175 of the Data Packet 170 each data bit which is not necessary to provide the host computer 40 with the desired information. For example, in the present example, the data bits in the data section 175 which are unrelated to the amount of power consumed during the requested period is purged from the Data Packet 170 to form processed data. Accordingly, the number of data bits transmitted over the wireless network 30 is reduced thereby reducing overall wireless traffic and costs associated therewith.

Next, in step 190, the processor 75 encrypts the processed data in accordance with an encrypting/decrypting program 140 stored in the gateway software 110. Encryption and decryption of the processed data takes place using conventional techniques known in the art. The encryption of the processed data provides an added level of security to the system 10 so that data in a packet 191 transmitted across the hardwired connection 40 coupled to the host computer 15 may not be viewed or manipulated prior to arrival thereof. In particular, the encryption of the processed data by the gateway software 110 is in addition to any encryption/ decryption which conventionally takes place across the wireless network 30 by the wireless interface devices 35, 50. Thus, following encryption and decryption of the data in the packet 190 by the wireless interface devices 50, 35, respectively, the processed data in the packet 190 remains encrypted by the encryption program 140 of the gateway software 110 thereby allowing the packet 190 to remain secure during transmission over the hardwired connection 40. As discussed below, in order to allow the host computer 15 to be able to retrieve the processed data encrypted by the gateway software 110, a corresponding encryption/ decryption program is stored in a memory 17 (FIG. 1) of the host computer 15.

Next, in step 200, the processor 75 assembles the packet 191 formed in step 190 into a format suitable for transmission over the wireless network 30 in a conventional manner. Further, the processor 75 encrypts the data in the packet 191 with a second layer of encryption in accordance with conventional wireless transmission standards.

Upon receipt of the packet 191 by the wireless interface device 35, the wireless interface device de-assemblies the packet 191 for communication over the hardwired network in a conventional manner. Further, the wireless interface device 35 de-crypts the data in the packet 191 from the second layer of encryption and forwards the packet to the host computer 15. Since the processor 75 in the wireless interface device 50 also encrypted the packet 190 with an additional layer of protection, the packet 190 remains encrypted during transmission over the hardwired network 40. Following decryption, the wireless interface device 35 transmits the packet 191 to the host computer 15 as depicted in step 210.

In step 215, following receipt of the packet 190, the host computer transmits a Host Acknowledgment Packet 220 to the meter 25. Prior to transmission, the Host Acknowledgment Packet 220 is encrypted by the encryption/decryption program stored in the memory 17 (FIG. 1) of the host computer 15, thereby providing added security during transmission of the data across the hardwired connection 40. The Host Acknowledgment Packet 220 is in the same format as the Acknowledge packet 182 described above. In step 232, the wireless interface device 35 forwards the Host Acknowledgment packet 220 to the wireless interface device 50 in a conventional manner by assembling and encrypting the Host Acknowledgment packet 220 into an appropriate format as described above with respect to step 200.

Upon receipt of the Host Acknowledgment packet 220 by the wireless interface device 50, the wireless interface device 50 initially de-assemblies and decrypts the second layer of encryption of Host Acknowledgment packet 220. Next, the wireless interface device 50 running the gateway software 110 decrypts the additional layer of encryption provided by the host computer 15. Following these steps, the wireless interface device 50 determines if the Host Acknowledgment packet 220 is in response to receiving the packet 190. If so, since the wireless interface device 50 has already acknowledged receipt of the Data Packet 170 from the meter 25 in step 180, the gateway software 110 directs the wireless interface device 50 to intercept the Host Acknowledgment packet 220 and not forwarded the packet to the meter 25. In this manner, the meter 25 does not receive duplicate acknowledgment packets for the same data transmission.

Figure 6:
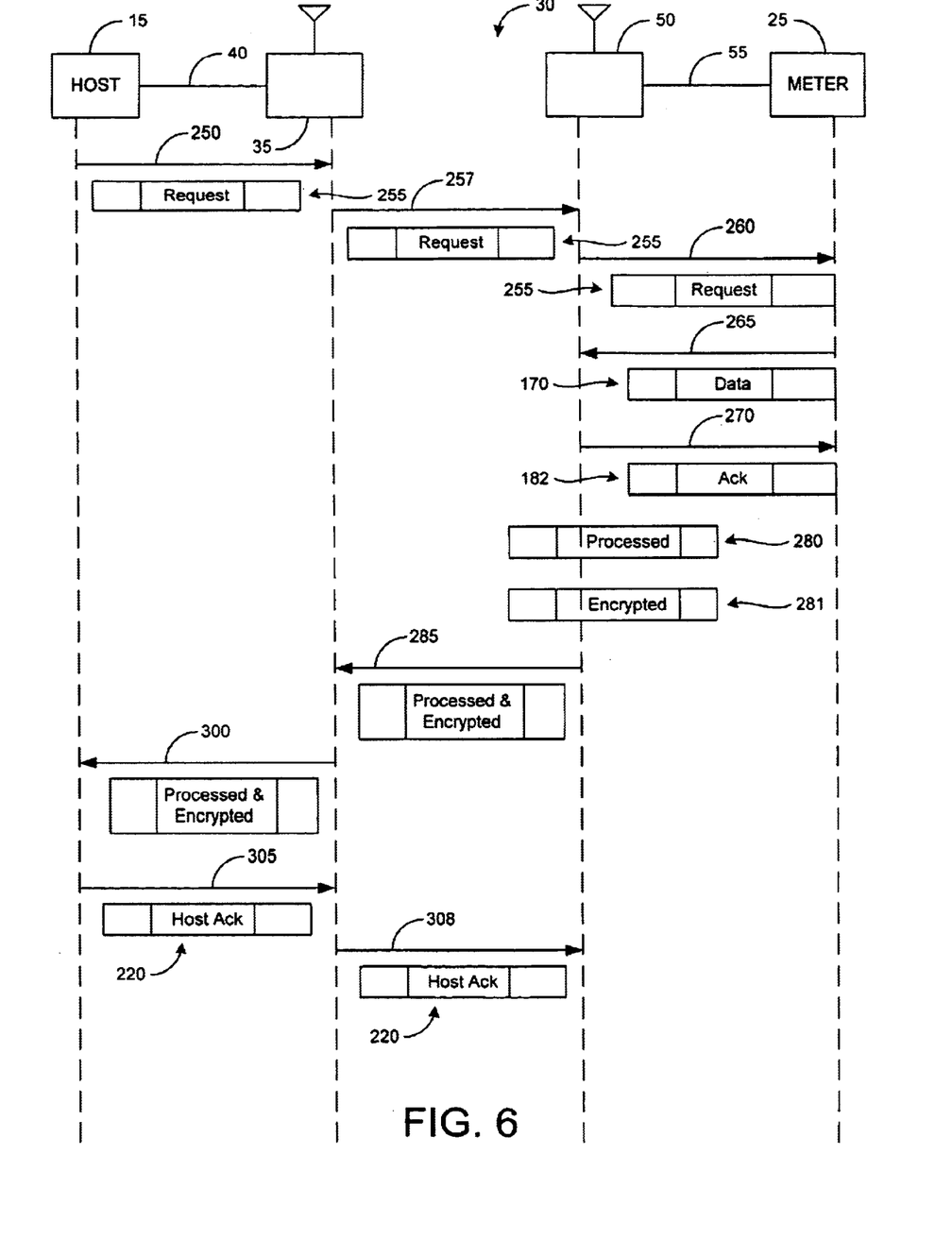
FIG. 6 illustrates the packet exchange between the host computer and meter according to another exemplary embodiment of the present invention.

Referring now to FIG. 6, another example of the operation of the system 10 in accordance with the present embodiment is depicted wherein a request for information originates from the host computer 15.

Referring initially to step 250, a Request For Information packet 255 is transmitted by the host computer 15 and destined for the meter 25. The Request For Information packet 255 is encrypted by the host computer 15 prior to transmission thereof to provide security across the hardwired connection 40. The Request For Information packet 255 is of the same format as the Request For Information packet 155 described in step 150.

In step 257, upon receipt of the Request For Information packet 255 by the wireless interface device 35, the wireless interface device 35 assemblies, encrypts and transmits the Request For Information packet 255 over the wireless network 30 in a conventional manner. Next, in step 260 the wireless interface device 50 de-assemblies and decrypts both levels of encryption of the Request For Information packet 255 and forwards the packet to the meter 25.

In response to receiving the Request For Information packet 255, the meter 25 transmits a Data Packet 170 in step 265. In step 270 the wireless interface device 50 running the gateway software 110 acknowledges receipt of the Data Packet 170 on behalf of the host computer 15 by transmitting an Acknowledge packet 182. Advantageously, by configuring the processor 75 to acknowledge the meter 25 in place of the host computer 15, the present invention is better able to avoid the meter 25 from timing out.

Next, in steps 280, 281 the wireless interface device 50 purges and encrypts the data in the Data Packet 170 in the same manner as described above with respect to steps 185 and 190. Accordingly, fewer data bits are transmitted over the wireless network 30 than in conventional systems and data transmission remains secure over the hardwired connection 40. In step 285, the wireless interface device 50 assemblies and further encrypts the processed data for transmission over the wireless network 30. Next, in step 300, the wireless interface device 35 receives the transmitted data, de-assembles and decrypts the processed data, and forwards the packet to the host computer 15 in the same manner as described above with respect to step 210.

Upon receipt of the packet by the host computer 15, the host computer again decrypts the packet and stores the requested information in memory 17 for subsequent processing. Additionally, in step 305, the host computer 15 transmits a Host Acknowledgment packet 220 to the wireless interface device 35 as described above with respect to step 215.

Upon receipt of the Host Acknowledgment packet 220, the wireless interface device 35 forwards the packet to the wireless interface device 50 as shown in step 308. In the present embodiment, the wireless interface device 50 operating in accordance with the gateway software 110 intercepts the Host Acknowledgment packet 220 and does not allow the packet to be forwarded to the meter 25. As described above, this avoids the meter 25 from receiving multiple acknowledgments from the same transmission of data since the wireless interface device 50 already acknowledged receipt of the Data Packet 170 in step 265. If the wireless interface device 50 operating the gateway software 110 does not receive a Host Acknowledgment packet 220 within a predetermined period of time, the wireless interface device 50 is configured to re-send the packet 200 to the host computer 15 containing the information requested. In this manner, the wireless interface device 50 operating in accordance with the gateway software 110 assumes the responsibility of ensuring that the desired information from the Data Packet 170 is properly delivered to the Host Computer 15 on behalf of the meter 25.

Figure 7:
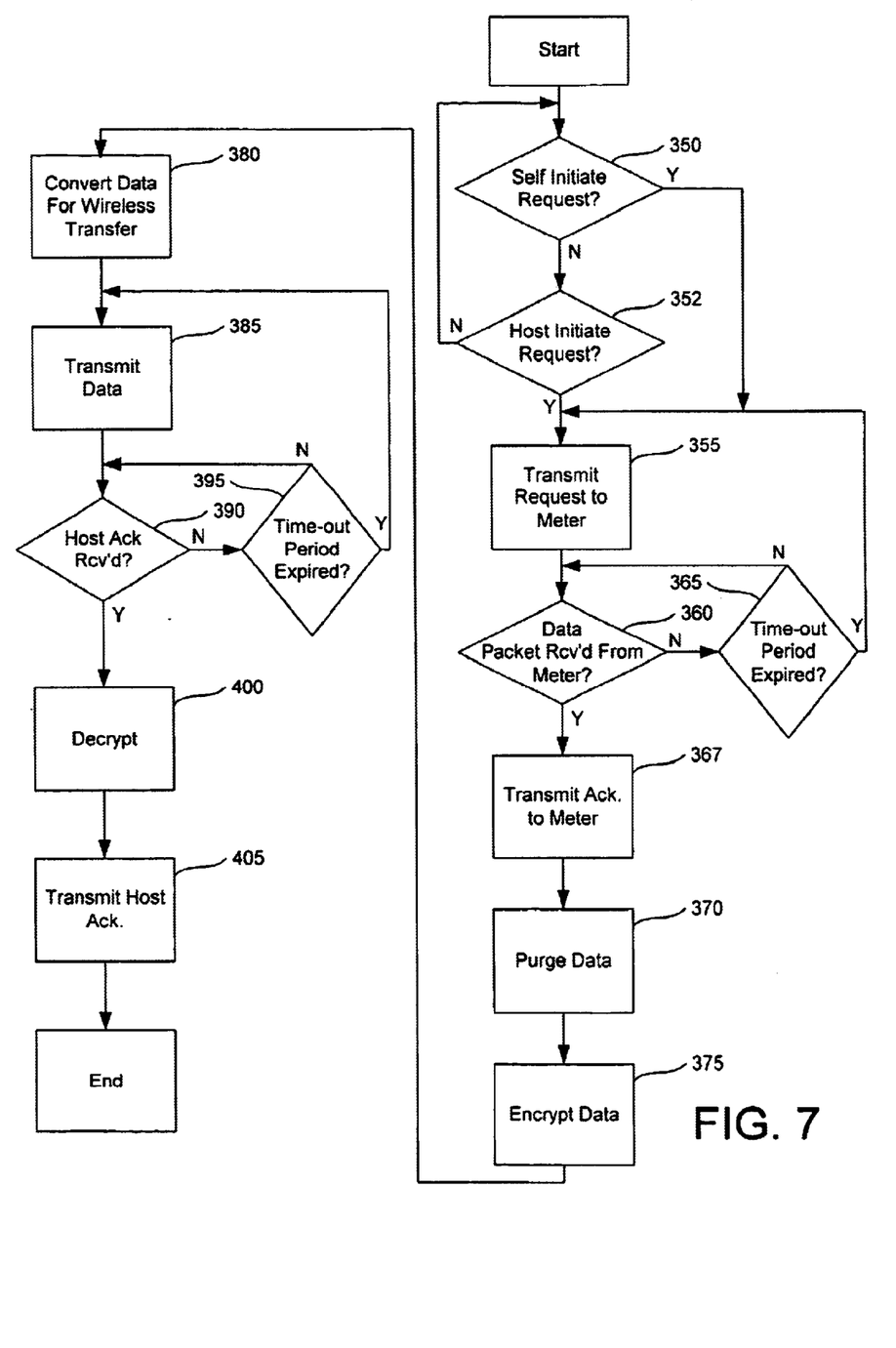
FIG. 7 illustrates a flow chart of the operations of a device executing the gateway software in accordance with the present invention.

Referring now to FIG. 7, a flowchart showing the operations of the wireless interface device 50 operating in accordance with the gateways software 110 is depicted. It will be appreciated that a person having ordinary skill in the art of computer programming would be able to write an appropriate computer program to carry out the steps and functions described herein and therefore additional detail related to such programming is omitted for sake of brevity. In step 350, the processor 75 of the wireless interface device 50 initially determines whether it is time to self initiate a request for information from the meter 25. For example, the processor 75 may be configured to initiate a request for information at periodic intervals which correspond to a frequency in which a customer is billed for consumption of a utility. If the processor 75 determines it is not time to initiate a request for information, the processor 75 proceeds to step 352. In step 352 the processor 75 determines whether a Request For Information packet 255 (FIG. 6) was received from the host computer 15. If the processor 75 does not receive a Request For Information packet 255, the processor 75 returns to step 350.

If in step 350 or step 352, the processor 75 determines a Request for Information packet should be transmitted to the meter 25, the processor 75 proceeds to step 355 where the Request For Information packet 155, 255 is provided to the meter 25. Next, in step 360 the processor 75 determines whether a Data Packet 170 (FIGS. 5 and 6) has been received in response to the Request For Information packet 155, 255. If the Data Packet 170 is not received, the processor 75 proceeds to step 365 where it is determined whether the meter 25 has failed to respond for a predetermined period of time. If the predetermined period of time has not been reached, the processor 75 returns to step 360. Otherwise the processor 75 returns to step 355 where the processor 75 re-transmits the Request For Information packet 155, 255.

If in step 360, the processor 75 determines a Data Packet 170 has been received, the processor 75 proceeds to step 367. In step 367 the processor 75 transmits an 182 Acknowledge packet 182 to the meter 25. As discussed above, because the processor 75 and meter 25 are coupled together via a hardwired connection, the meter 25 typically receives the Acknowledge packet 182 within a short period of time which is less than a preprogrammed time-out period associated with the meter 25. Thus, since the Acknowledge packet 182 typically is received prior to the time-out period of the meter 25, the meter does not re-transmit the Data Packet 170 causing added delay in processing the request for information.

Following step 367 the processor 75 proceeds to step 370 where the processor 75 purges the Data Packet 170 of unnecessary data bits. In particular, the processor 75 is configured to compare the information contained in the Data packet 170 with the information requested by the Request For Information packet 155, 255 and remove any data bits which are not necessary to reply to the request. In this manner, fewer data bits are transmitted over the wireless network 30 than in conventional systems.

Once purged, the processor 75 proceeds to step 375 where the processed packet 185 is encrypted with a first level of encryption to provide security during transmission over the hardwired connection 40. Next, in step 380 the resultant packet 191 is converted in a conventional method to a format suitable for transfer over the wireless network 30 as discussed with respect to step 200 above. Following step 380, the processor 75 proceeds to step 385 where the packet 191 is transmitted over the wireless network 30.

Once the packet 191 is transmitted over the wireless network 30, the processor 75 next proceeds to step 390 where the processor 75 determines whether a Host Acknowledgment packet 220 has been received. If the Host Acknowledgment packet 220 has not been received, the processor 75 proceeds to step 395. In step 395 the processor 75 determines whether a predetermined period has passed without receipt of the Host Acknowledgment packet 220. If the predetermined period of time has not passed, the processor 75 returns to step 390. If, on the other hand, the predetermined period of time has passed, the processor 75 returns to step 385 where the packet 191 is re-transmitted.

If in step 390 a Host Acknowledgment packet 220 is received, the processor 75 proceeds to step 400. In step 400 the processor 75 performs conventional steps to retrieve the data as discussed above with respect to step 230. Further, in step 400, the processor 75 decrypts the Host Acknowledgment packet 220 of the encryption performed by the Host computer 15. Finally in step 405, the processor 75 retains the Host Acknowledgment packet 220 so that the meter 25 does not receive multiple acknowledgments in response to transmitting a single Data packet 170. Accordingly, the operations of the gateway software are transparent to the meter 25.

Figure 8:
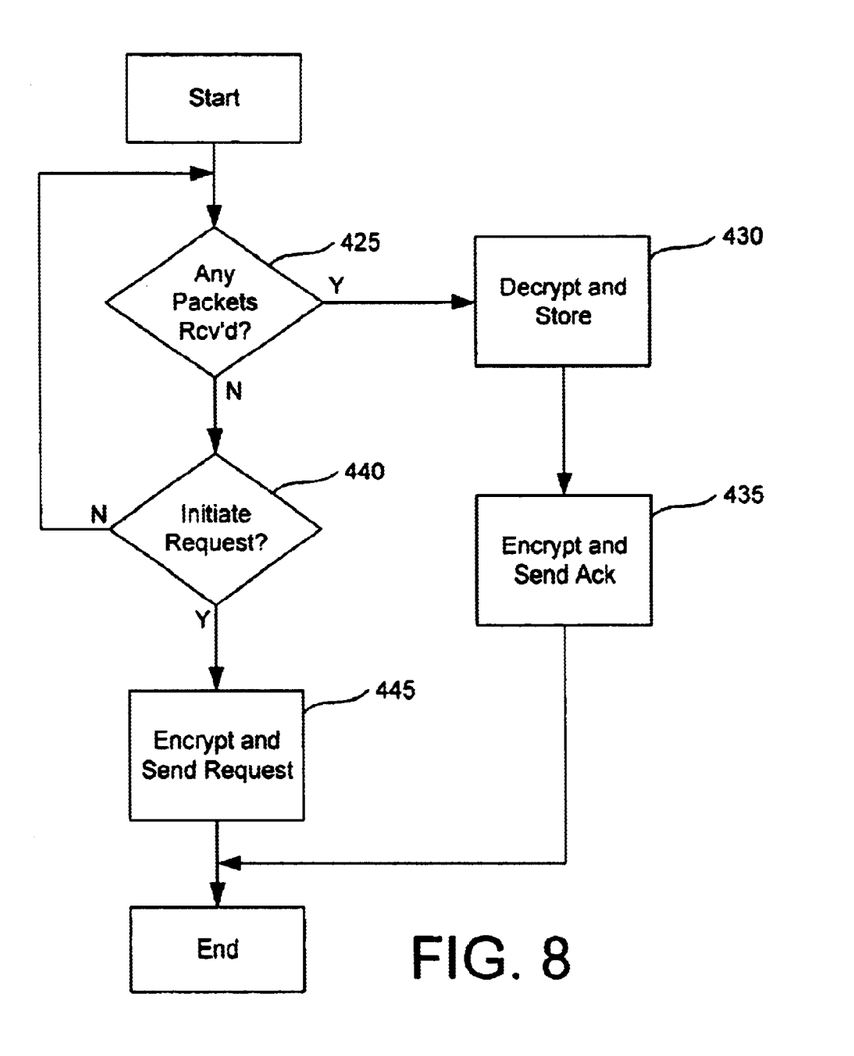
FIG. 8 illustrates a flow chart of the operations of the host computer engaged in communication with the meter in accordance with the present invention.

Referring next to FIG. 8, the operations of the host computer 15 as it relates to interfacing with the meter 25 is discussed in more detail. In particular, in step 425 processor 19 (FIG. 1) of the host computer 15 determines whether any packets have been received from the meter 25. If a packet is received, the processor 19 proceeds to step 430 where the processor 19 decrypts the packet and stores the associated information into memory 17 (FIG. 1). Following step 430, the processor 19 proceeds to step 435 where the processor 19 constructs, encrypts and transmits a Host Acknowledgment packet 220.

If in step 425, the processor 19 of the host computer 15 determines that no packets have been received, the processor 19 proceeds to step 440. In step 440, the processor 19 determines whether it desires to transmit a Request For Information packet 220 (FIG. 6). For example, the processor 19 may determine it desires to transmit a Request For Information packet 220 based on an external request made by a worker of the utility company or the like. If the processor 19 determines it does not desire to transmit a Request For Information packet 220, the processor 19 returns to step 425. If, on the other hand, the processor 19 does determine to transmit a Request For Information packet 220, the processor 19 proceeds to step 445 where the processor 19 encrypts and transmits the Request For Information packet 220 as described above with respect to step 250 (FIG. 6).

The operations of both the wireless interface device 35 and meter 25 are conventional and therefore further discussion related to such operations are omitted for sake of brevity.

Figure 9:
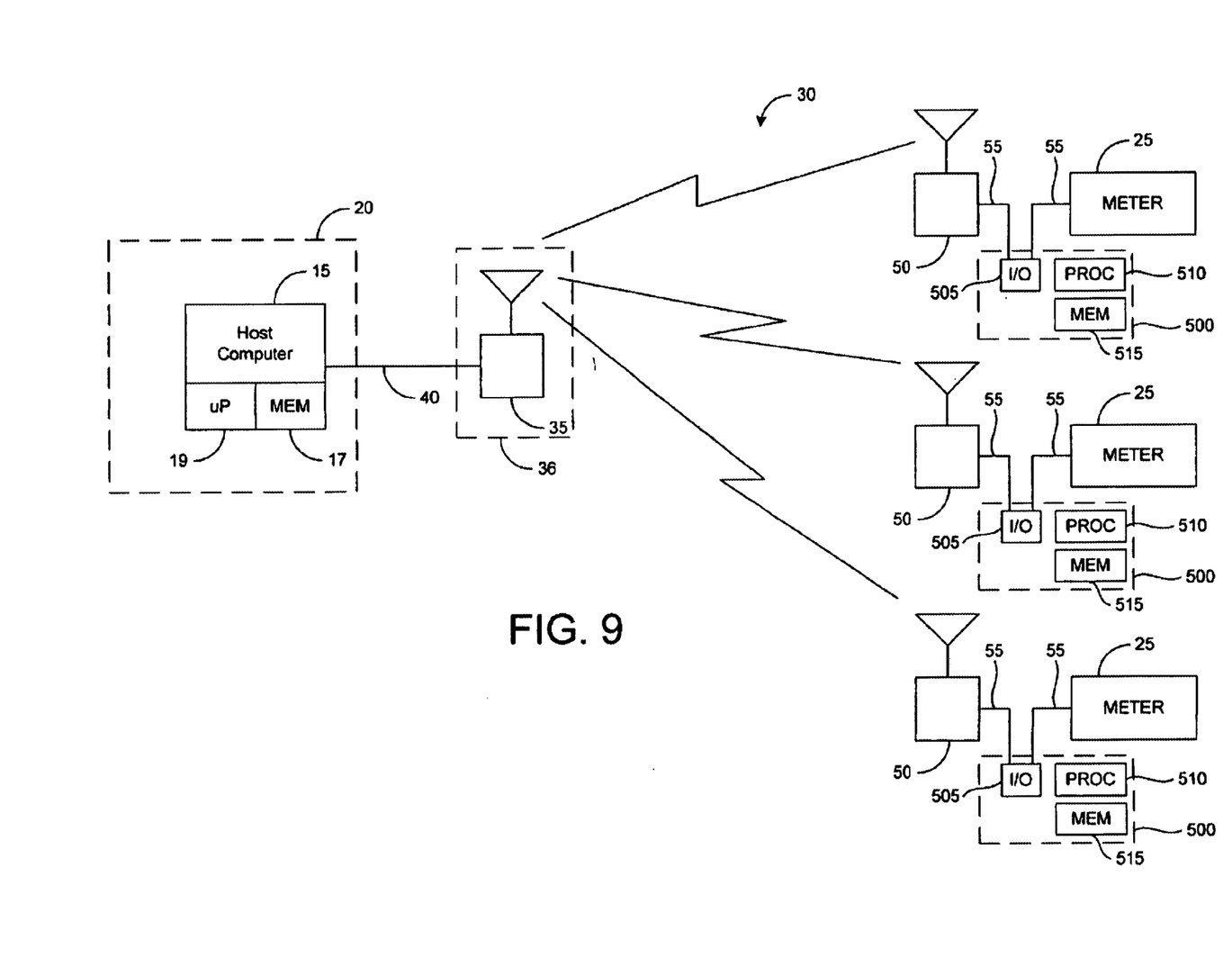
FIG. 9 illustrates a system view of a meter communicating with a host computer through a gateway system in accordance with an alternative embodiment of the present invention.

Referring now to FIG. 9, an alternative embodiment of the present invention is depicted wherein the gateway software 110 interfaces with the meter 25 independent of the hardware associated with the wireless interface device 50. In particular, in this embodiment the gateway software operates in a dedicated device 500 coupled to the hardwired connection 55 via input/output (I/O) coupler 505. A dedicated processor 510 coupled to the I/O coupler 505 executes the gateway software 110 which is stored in dedicated memory 515. In this manner, the gateway software 110 may perform the same functions as described above with respect to data exchanged between the meter 25 and host computer 15 without modifying the configuration of the wireless interface device 50.

The invention has been described with reference to the preferred embodiments. Obviously, modifications and alterations will occur to others upon reading and understanding the preceding detailed description.

For example, while the preferred embodiment discusses the host computer 15 and wireless interface device 50 transmitting to the meter 25 a Request For Information packet, it will be appreciated that other types of communication may also take place. For instance, during a boot-up routine the gateway software 110 may be configured to obtain on behalf of the host computer 15 the meter ID number of the meter 25 or other appropriate information. In this manner, fewer data bits need to be transmitted over the wireless network 30 thereby saving cost and reducing wireless traffic.

It is intended that the invention be construed as including all such modifications alterations, and equivalents thereof and is limited only by the scope of the following claims.

What is claimed is:

1. A method for facilitating data exchange between a utility meter for monitoring utility consumption and a host device, wherein the meter is coupled to a first wireless transceiver with a first hardwired connection and the host device is coupled to a second wireless transceiver with a second hardwired connection and the first transceiver and the second transceiver are operative to wirelessly exchange data therebetween, comprising:

providing a gateway meter management component coupled to the first hardwired connection;

generating a request for the meter to provide a predetermined set of information with the gateway meter management component;

transmitting the request from the gateway meter management component to the meter over the first hardwired connection;

upon receipt of the request by the meter, the meter transmitting a meter data set that contains the predetermined set of information to the gateway meter management component over the first hardwired connection;

upon receipt of the meter data set by the gateway meter management component, purging the meter data set of at least a portion of information unrelated to the predetermined set of information to provide a processed data set; and transmitting the processed data set with the first transceiver and addressed for receipt by the second wireless transceiver.

2. The method of claim 1, wherein the gateway meter management component is embodied as executable logic in the first wireless transceiver and wherein the first wireless transceiver executes the logic independently of operations carried out by the meter.

3. The method of claim 2, wherein the first transceiver is a modem.

4. The method of claim 1, wherein the gateway meter management component is embodied as executable logic in a dedicated device coupled to the first hardwired connection, the dedicated device executing the logic independently of operations carried out by the first wireless transceiver and operations carried out by the meter.

5. The method of claim 1, further comprising encrypting the processed data prior to wireless transmission.

6. The method of claim 5, further comprising forwarding the processed data as received by the second transceiver to the host device and decrypting the encrypted processed data with the host device.

7. The method of claim 1, further comprising:

transmitting a host acknowledgment packet generated by the host and intended for receipt by the meter from the second wireless transceiver to the first wireless receiver; and intercepting the host acknowledgment packet with the gateway meter management component so as to prevent the host acknowledgment packet from being received by the meter.

8. The method of claim 1, further comprising:

upon receipt of the meter data set by the gateway meter management component, generating an acknowledgment receipt in substitution for a host generated acknowledgment receipt of the meter data set with the gateway meter management component; and transmitting the substitute host acknowledgment receipt to the meter over the first hardwired connection.

9. The method of claim 1, wherein the meter is selected from an electric meter, a gas meter, a water meter and combinations thereof.

10. The method of claim 1, wherein the second hardwired connection is at least in part an internet connection.

11. The method of claim 1, further comprising:

conducting a first encryption of the processed data set with the gateway meter management component; and conducting a second encryption of the encrypted processed data set with the first wireless transceiver.

12. The method of claim 11, further comprising:

decrypting the second encryption performed by the first wireless transceiver with the second wireless transceiver; and decrypting the first encryption performed by the gateway meter management component with the host.

13. A gateway meter management component for facilitating data exchange between a utility meter for monitoring utility consumption and a host device, wherein the meter is coupled to a first wireless transceiver with a first hardwired connection and the host device is coupled to a second wireless transceiver with a second hardwired connection and the first transceiver and the second transceiver are operative to wirelessly exchange data therebetween, the gateway meter management component comprising:

logic to generate a request for the meter to provide a predetermined set of information;

logic to transmit the request from the gateway meter management component to the meter over the first hardwired connection;

logic to receive a meter data set that contains the predetermined set of information from the meter over the first hardwired connection;

logic to, upon receipt of the meter data set, purge the meter data set of at least a portion of information unrelated to the predetermined set of information and to provide a processed data set; and logic to deliver the processed data set to the first transceiver for transmission to the second wireless transceiver.

14. The gateway meter management component of claim 13, wherein the gateway meter management component is embodied as executable logic in the first wireless transceiver and wherein the first wireless transceiver executes the logic independently of operations carried out by the meter.

15. The gateway meter management component of claim 13, wherein the gateway meter management component is embodied as executable logic in a dedicated device coupled to the first hardwired connection, the dedicated device executing the logic independently of operations carried out by the first wireless transceiver and operations carried out by the meter.

16. The gateway meter management component of claim 13, further comprising logic to intercept a host acknowledgment packet generated by the host and intended for receipt by the meter with the gateway meter management component so as to prevent the host acknowledgment packet from being received by the meter.

17. The gateway meter management component of claim 13, further comprising logic to, upon receipt of the meter data set, generate an acknowledgment receipt in substitution for a host generated acknowledgment receipt of the meter data set and transmit the substitute host acknowledgment receipt to the meter over the first hardwired connection.

18. A system for exchanging data between a utility meter and a host device, comprising:

a first wireless transceiver coupled to the meter with a first hardwired connection;

a second wireless transceiver coupled to the host with a second hardwired connection; and a gateway meter management component according to claim 13 coupled to the first hardwired connection.

19. The system of claim 18, wherein the gateway meter management component is embodied as executable logic in the first wireless transceiver and wherein the first wireless transceiver executes the logic independently of operations carried out by the meter.

20. The system of claim 18, wherein the gateway meter management component is embodied as executable logic in a dedicated device coupled to the first hardwired connection, the dedicated device executing the logic independently of operations carried out by the first wireless transceiver and operations carried out by the meter.

21. The system of claim 19, wherein the second hardwired connection is at least in part an internet connection.

22. The system of claim 18, wherein the gateway meter management component further includes logic to conduct a first encryption of the processed data set and the first wireless transceiver includes logic to conduct a second encryption of the encrypted processed data set.

23. The method of claim 22, wherein the second wireless transceiver includes logic to decrypt a second encryption performed by the first wireless transceiver and the host includes logic to decrypt a first encryption performed by the gateway meter management component.

* * * * *

UNITED STATES PATENT AND TRADEMARK OFFICE
CERTIFICATE OF CORRECTION

PATENT NO. : 6,747,571 B2
DATED : June 8, 2004
INVENTOR(S) : Fierro et al.

It is certified that error appears in the above-identified patent and that said Letters Patent is hereby corrected as shown below:

Column 16,
Line 29, replace "19" with -- 18 --.

Signed and Sealed this

Twenty-fourth Day of August, 2004

JON W. DUDAS
*Director of the United States Patent and Trademark Office*